US 8,160,570 B2

(12) United States Patent
Sabat, Jr. et al.

(10) Patent No.: US 8,160,570 B2
(45) Date of Patent: *Apr. 17, 2012

(54) MULTIPROTOCOL ANTENNA SYSTEM FOR MULTIPLE SERVICE PROVIDER-MULTIPLE AIR INTERFACE CO-LOCATED BASE STATIONS

(75) Inventors: John Sabat, Jr., Merrimack, NH (US); Peter Yelle, Chelmsford, MA (US)

(73) Assignee: LGC Wireless, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,337

(22) Filed: Feb. 23, 2011

(65) Prior Publication Data

US 2011/0143649 A1    Jun. 16, 2011

Related U.S. Application Data

(63) Continuation of application No. 12/817,706, filed on Jun. 17, 2010, now Pat. No. 7,920,858, which is a continuation of application No. 11/098,941, filed on Apr. 5, 2005, now Pat. No. 7,761,093, which is a continuation of application No. 09/818,986, filed on Mar. 27, 2001, now Pat. No. 6,963,552.

(60) Provisional application No. 60/192,186, filed on Mar. 27, 2000.

(51) Int. Cl.
*H04W 4/00*    (2009.01)

(52) U.S. Cl. ............... 455/422.1; 455/426.1; 455/448; 455/446; 455/562.1; 455/7

(58) Field of Classification Search ............... 455/422.1, 455/426.1, 448, 446
See application file for complete search history.

(56) References Cited

U.S. PATENT DOCUMENTS 4,183,054 A    1/1980    Patisaul et al.
4,451,916 A    5/1984    Casper et al.
(Continued)

FOREIGN PATENT DOCUMENTS

EP    0391597    10/1990
(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Vladimir Magloire
(74) *Attorney, Agent, or Firm* — Fogg & Powers LLC

(57) ABSTRACT

A hub unit is configured to digitize first and second analog radio frequency signals in order to generate first and second digital data, respectively, indicative of the first and second analog radio frequency signals. The first and second analog radio frequency signals are broadcast from first and second base stations, respectively, associated with first and second cellular service providers, respectively, using first and second air interfaces, respectively. The first and second digital data are transported to a radio access node using a shared transport medium. The radio access node is configured to reconstruct versions of the first and second analog radio frequency signals from the first and second digital data, respectively, using first and second digital-to-analog converters and is also configured to generate first data packets from a first data radio frequency signal. The first data packets are communicated to the hub unit using the shared transport medium.

20 Claims, 10 Drawing Sheets

U.S. PATENT DOCUMENTS

| | | |
|---|---|---|
| 4,611,323 A | 9/1986 | Hessenmuller |
| 4,628,501 A | 12/1986 | Loscoe |
| 4,654,843 A | 3/1987 | Roza et al. |
| 4,691,292 A | 9/1987 | Rothweiler |
| 4,726,644 A | 2/1988 | Mathis |
| 4,999,831 A | 3/1991 | Grace |
| 5,193,109 A | 3/1993 | Chien-Yeh Lee |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,546,397 A | 8/1996 | Mahany |
| 5,566,168 A | 10/1996 | Dent |
| 5,592,470 A * | 1/1997 | Rudrapatna et al. .......... 370/320 |
| 5,621,786 A | 4/1997 | Fischer et al. |
| 5,627,879 A | 5/1997 | Russell et al. |
| 5,642,405 A | 6/1997 | Fischer et al. |
| 5,644,622 A | 7/1997 | Russell et al. |
| 5,657,374 A | 8/1997 | Russell et al. |
| 5,682,256 A | 10/1997 | Motley et al. |
| 5,732,076 A | 3/1998 | Ketseoglou et al. |
| 5,761,619 A | 6/1998 | Danne et al. |
| 5,771,449 A | 6/1998 | Blasing et al. |
| 5,781,541 A | 7/1998 | Schneider |
| 5,781,859 A | 7/1998 | Beasley |
| 5,781,865 A | 7/1998 | Gammon |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,822,324 A | 10/1998 | Kostresti et al. |
| 5,852,651 A | 12/1998 | Fischer et al. |
| 5,907,544 A | 5/1999 | Rypinski |
| 5,969,837 A | 10/1999 | Farber et al. |
| 5,987,014 A | 11/1999 | Magill et al. |
| 6,034,950 A | 3/2000 | Sauer et al. |
| 6,108,113 A | 8/2000 | Fee |
| 6,108,550 A | 8/2000 | Wiorek et al. |
| 6,108,626 A | 8/2000 | Cellario et al. |
| 6,157,659 A | 12/2000 | Bird |
| 6,188,693 B1 | 2/2001 | Murakami |
| 6,222,660 B1 | 4/2001 | Traa |
| 6,226,274 B1 | 5/2001 | Reese et al. |
| 6,373,887 B1 | 4/2002 | Aiyagari et al. |
| 6,377,640 B2 | 4/2002 | Trans |
| 6,498,936 B1 | 12/2002 | Raith |
| 6,504,831 B1 | 1/2003 | Greenwood et al. |
| 6,567,473 B1 | 5/2003 | Tzannes |
| 6,667,973 B1 | 12/2003 | Gorshe et al. |
| 6,674,966 B1 | 1/2004 | Koonen |
| 6,704,545 B1 | 3/2004 | Wala |
| 6,729,929 B1 | 5/2004 | Sayers et al. |
| 6,768,745 B1 | 7/2004 | Gorshe et al. |
| 6,785,558 B1 | 8/2004 | Stratford et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,917,614 B1 | 7/2005 | Laubach et al. |
| 6,963,552 B2 | 11/2005 | Sabat, Jr. et al. |
| 7,127,175 B2 | 10/2006 | Mani et al. |
| 7,205,864 B2 | 4/2007 | Schultz, Jr. et al. |
| 7,215,651 B2 | 5/2007 | Millar |
| 7,289,972 B2 | 10/2007 | Rieser et al. |
| 2002/0072329 A1 | 6/2002 | Bandeira et al. |
| 2002/0167954 A1 | 11/2002 | Highsmith et al. |
| 2002/0191565 A1 | 12/2002 | Mani et al. |
| 2003/0043928 A1 | 3/2003 | Ling et al. |
| 2003/0157943 A1 | 8/2003 | Sabat, Jr. |
| 2004/0010609 A1 | 1/2004 | Vilander et al. |
| 2004/0037565 A1 | 2/2004 | Young et al. |
| 2004/0198453 A1 | 10/2004 | Cutrer et al. |
| 2004/0219950 A1 | 11/2004 | Pallonen et al. |
| 2005/0007993 A1 | 1/2005 | Chambers et al. |
| 2005/0147067 A1 | 7/2005 | Mani et al. |
| 2005/0201323 A1 | 9/2005 | Mani et al. |
| 2005/0250503 A1 | 11/2005 | Cutrer |
| 2006/0121944 A1 | 6/2006 | Buscaglia et al. |
| 2006/0193295 A1 | 8/2006 | White et al. |

FOREIGN PATENT DOCUMENTS

| | | |
|---|---|---|
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9837715 | 8/1998 |
| WO | 9937035 | 7/1999 |
| WO | 9948312 | 9/1999 |
| WO | 0174013 | 10/2001 |
| WO | 0174100 | 10/2001 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

"Tektronix Synchronous Optical Network (SONET)", "http://www.iec.org/online/tutorials/sonet/topic03.html", Aug. 28, 2002, Publisher: International Engineering Consortium.

European Patent Office, "European Search Report", Aug. 4, 2011, Published in: EP.

* cited by examiner

Simulcast Varied to Equalize Reverse Link Budgets
and to Balance With Forward Link Budget

| | CDMA | TDMA | GSM1900 |
|---|---|---|---|
| Reverse Link | | | |
| Mobile Transmit Power | 23 dBm | 23 dBm | 30 dBm |
| RAN Sensitivity | -120 dBm | -111 dBm | -110 dBm |
| Allowable Reverse Path Loss without Simulcast | 143 dB | 139 dB | 140 dB |
| Number in Simulcast | 8 | 3 | 4 |
| Allowable Reverse Path Loss with Simulcast | 134 dB | 134 dB | 134 dB |
| Forward Link | | | |
| RAN Transmit Power per Traffic Channel | 20 dBm | 32 dBm | 32 dBm |
| Mobile Sensitivity less Interference Margin | -114 dBm | -102 dBm | -102 dBm |
| Allowable Forward Path Loss | 134 dB | 134 dB | 134 dB |

FIG. 5

MULTIPROTOCOL ANTENNA SYSTEM FOR MULTIPLE SERVICE PROVIDER-MULTIPLE AIR INTERFACE CO-LOCATED BASE STATIONS

RELATED APPLICATIONS

This application is a continuation of U.S. patent application Ser. No. 12/817,706 filed Jun. 17, 2010, which is a continuation of U.S. patent application Ser. No. 11/098,941, filed Apr. 5, 2005 and which issued as U.S. Pat. No. 7,761,093, which, in turn, is a continuation of U.S. patent application Ser. No. 09/818,986, filed Mar. 27, 2001, which issued as U.S. Pat. No. 6,963,552, which claims the benefit of U.S. Provisional Application Ser. No. 60/192,186, filed on Mar. 27, 2000, all of which are incorporated herein by reference.

BACKGROUND

The wireless telecommunication industry continues to experience significant growth and consolidation. In the United States, market penetration is near 32% with approximately 86 million users nationwide. In 1999 the total number of subscribers increased 25% over the previous year, with the average Minutes of Use (MOU) also increasing by about 20% per user. If one considers growth in the digital market, in as short as three years, the digital subscriber base has grown to 49 million users, or approximately equal to the installed number of users of analog legacy systems. Even more interesting is an observation by Verizon Mobile that 70% of their busy hour traffic (an important system design parameter) is digital traffic, although only approximately 40% of the total number of their subscribers are digital users. The Verizon Mobile observation indicates the digital subscriber will drive the network design through its increasing usage, whereas the analog user is truly a passive "glovebox" subscriber.

Similar growth has been witnessed in other countries, especially in Northern and Western Europe, where market penetration is even higher, approaching 80% in some areas, and digital service is almost exclusively used.

With the availability of Personal Communications Service (PCS) frequencies in the United States, and additional continuing auctions of spectrum outside of the traditional 800-900 MegaHertz (MHz) radio band, the past few years have also seen increased competition among service providers. For example, it has also been estimated that 88% of the US population has three or more different wireless service providers from which to choose, 69% have five or more, and about 4% have as many as seven service providers in their local area.

In 1999 total wireless industry revenue increased to $43 B, representing an approximate 21% gain over 1998. However, a larger revenue increase would have been expected given the increased subscriber count and usage statistics. It is clear that industry consolidation, the rush to build out a nationwide footprint by multiple competing service providers, and subsequent need to offer competitive pricing plans has had the effect of actually diminishing the dollar-per-minute price that customers are willing to pay for service.

These market realities have placed continuing pressure on system designers to provide system infrastructure at minimum cost. Radio tower construction companies continue to employ several business strategies to serve their target market. One approach, their historical business strategy, is build-to-suit (i.e., at the specific request and location as specified by a wireless operator). But some have now taken speculation approach, where they build a tower and then work with local government authorities to force new service providers to use the already existing towers. This speculation build approach, spawned by the zoning by-law backlash, is actually encouraged by communities to mitigate the "unsightly ugliness" of cellular phone towers. This is seemingly the best alternative, since Federal laws no longer permit local zoning authorities to completely ban the deployment of wireless infrastructure in a community. Often the shared tower facility is zoned far removed from residential areas, in more commercialized areas of town, along heavily traveled roads, or in more sparsely populated rural sections. But providing such out of the way locations for towers often does not fully address each and every wireless operator's capacity or coverage need.

Each of the individual wireless operators compete for the household wireline replacement, and as their dollar-per-MOU is driven down due to competition in the "traditional" wireless space, the "at home" use is one of the last untapped markets.

As the industry continues to consolidate, the wireless operator will look for new ways to offer enhanced services (coverage or products) to maintain and capture new revenue.

Considering the trends that have appeared over recent years, when given the opportunity to displace the household wireline phone with reliable wireless service, a wireless service operator may see their average MOUs increase by a factor of 2 to 4, thereby directly increasing their revenue potential 200 to 400%. In order to achieve this, the wireless operator desires to gain access throughout a community as easily as possible, in both areas where wireless facilities are an allowed use and in where they are not, and blanket the community with strong signal presence.

SUMMARY

Certain solutions are emerging that provide an alternative to the tower build out approach. In particular, wireless signal distribution systems employ a distribution media such as a cable television infrastructure or optical fiber data network to distribute Radio Frequency (RF) signals. This allows the capacity of a single base station to be distributed over an area which is the equivalent of multiple traditional cellular sites without degradation in coverage or call quality.

However, even these systems have a shortcoming in that they are typically built out for one selected over the air protocol and are controlled by a single service provider. Thus, even with such systems as they are presently known, it becomes necessary to build out and overlay multiple base stations and multiple signal distribution networks for multiple service providers.

The present invention is an open access signal distribution system in which a variety of wireless voice, data and other services and applications are supported. The open access systems makes use of a distributed Radio Frequency (RF) distribution network and associated network entities that enable the system operator to employ a wireless infrastructure network that may be easily shared among multiple wireless service providers in a given community. The open access system provides the ability for such operators and service providers to share the infrastructure regardless of the specific RF air interface or other signal formatting and/or managing messaging formats that such operators choose to deploy.

In one configuration, the present invention consists of a system in which a base station interface located at a central hub location converts radio frequency signals associated with multiple base stations, of the same or even different wireless service providers, to and from a transport signaling format. A shared transport medium, such as a fiber optic data network or the like is then used for transporting the converted signals from the hub location to a number of remote access node locations.

The access node locations each have Radio Access Node equipment located therein. The Radio Access Nodes (RANs) are each associated with a particular coverage area. The RANs have within them a number of slice modules, with each slice module containing equipment that converts the radio signals required for a particular service provider to and from the transport signaling format.

In a preferred embodiment, the transport medium may be an optical fiber telecommunications network such as provided through the SONET type digital frame formatting. In such a configuration, the SONET data formatting is arranged so that certain data frames are associated with the slices in a given Radio Access Node on a time slotted basis. In such a configuration, signal down converter modules convert the radio frequency signals associated with each base station to an Intermediate Frequency (IF) signal. Associated analog to digital (A/D) modules also located at the hub then convert the Intermediate Frequency signals to digital signals suitable for handling by a transport formatter that formats the converted digital signals to the proper framing format for the SONET digital transport.

Other transport media may be used such as Internet Protocol (IP) over Digital Wavelength Division Multiplexing (DWDM).

In one other aspect the invention concerns the aggregation of different Radio Frequency (RF) signaling formats onto a common transport mechanism. In this embodiment, a first and second base station operate according to respectively, first and second different wireless system air interfaces. A transport medium interface converts the radio frequency signals transmitted by the first and second base stations to a common transport medium. The first and second base station may optionally also be operated under the control of two different service providers. In this arrangement, a plurality of remotely located Radio Access Nodes (RANs) each provide radio signal coverage to a predetermined portion of a total system coverage area. Each Radio Access Node is coupled to receive signals from the common transport medium. Each Radio Access Node also contains a first and second slice module associated with the respective one of the first and/or second base station. Each slice module contains a suite of radio transmitter, amplifier and antenna equipment as required by its associated air interface.

In another aspect the present invention concerns equalizing power levels of Radio Frequency signals radiated by the Radio Access Nodes at levels appropriate for respectively different air interfaces. In particular, in such a system a first and second base station are located at a central location and operate according to respectively different wireless system air interfaces. A transport medium interface converts the Radio Frequency signals transmitted by the first and second base stations to a common transport medium signaling format. At a plurality of remote locations Radio Access Nodes (RANs) are located. Each Radio Access Node is coupled to receive signals from the common transport medium. Each Radio Access Node contains at least a first and second slice module that is associated with and responsible for converting signals associated with the first and second base stations.

In this instance, the invention includes means for equalizing the receive sensitivities of the Radio Access Nodes at levels for the appropriate for the respectively different air interfaces, such as by managing the number of RANs in simulcast depending upon the particular air interface.

This configuration permits for example, the deployment for the set of shared RANs at common RAN remote locations without having to deploy multiple RAN locations for different air interfaces even when such air interfaces have different receive sensitivities and coverage distances. Thus the Radio Access Nodes for two or more different air interfaces may be co-located throughout the coverage system area reducing the overall system build out requirements.

In yet another aspect, the present invention is a method for providing access to radio equipment distributed throughout a coverage area to multiple wireless communication service providers. This method involves the steps of accepting requests for radio signal distribution service from the service providers, the request specifying a desired air interface and an indication of which portions of a coverage area the particular air interface is to be supported. The service provider then installs common base station equipment operating with the air interface specified by the service provider at a central location with the base station equipment being co-located with base station equipment specified by other wireless service providers. The commonly located base station equipment is then coupled to receive traffic signals from a signaling network used by the wireless communication service provider, the signaling network carrying such transport formatted Radio Frequency signals over a common transport medium. A data processor then controls the connection of transport signal to specific Radio Access Nodes as specified by the wireless system operator.

DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 shows one example of a calculation to determine how simulcast operation can be coordinated to equalize a reverse link budget and provide balancing with a forward link budget.

DETAILED DESCRIPTION

A description of preferred embodiments of the invention follows.

Figure 1:
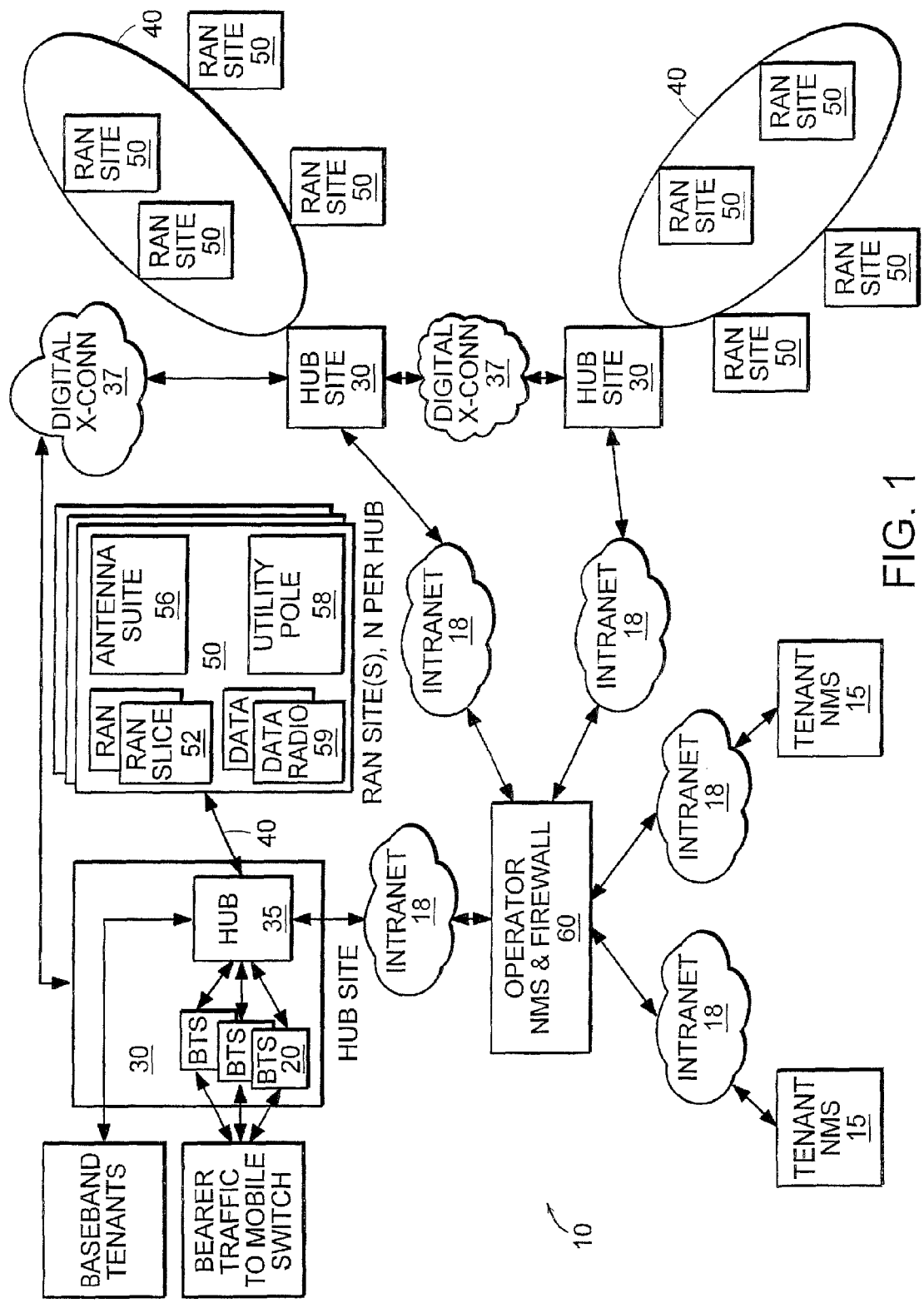
FIG. 1 is a block diagram of an open access system according to the invention.

While this invention has been particularly shown and described with references to preferred embodiments thereof, it will be understood by those skilled in the art that various changes in form and details may be made therein without departing from the scope of the invention encompassed by the appended claims. Turning attention now to the drawings more particularly, FIG. 1 is a diagram of an open access system 10. The open access system 10 is an open access network supporting a multitude of wireless voice, data, video services and applications. Wireless Service Providers (WSP) and Wireless Internet Service (WISP) Providers, commonly known as tenants, may use open access system 10 to either enhance or replace existing networks, wired or wireless, or to develop new networks.

Open access system 10 is a multi-frequency, multi-protocol Radio Frequency (RF) access network, providing cellular, Personal Communication Services (PCS), and wireless data coverage via a distributed RF access system. Open access system 10 is comprised of base stations 20, located at hub sites 30. The base stations 20 are connected via high speed datalinks 40 to distributed RF access nodes (RANs) 50. The system 10 is, in effect, a signal distribution network and associated management entities that enable a network operator to deploy a wireless infrastructure network that may easily be shared among multiple wireless system operators in a given community. The open access network may be shared regardless of the specific RF air interface formatting and management messaging formats that each wireless operator chooses to deploy.

Figure 2:
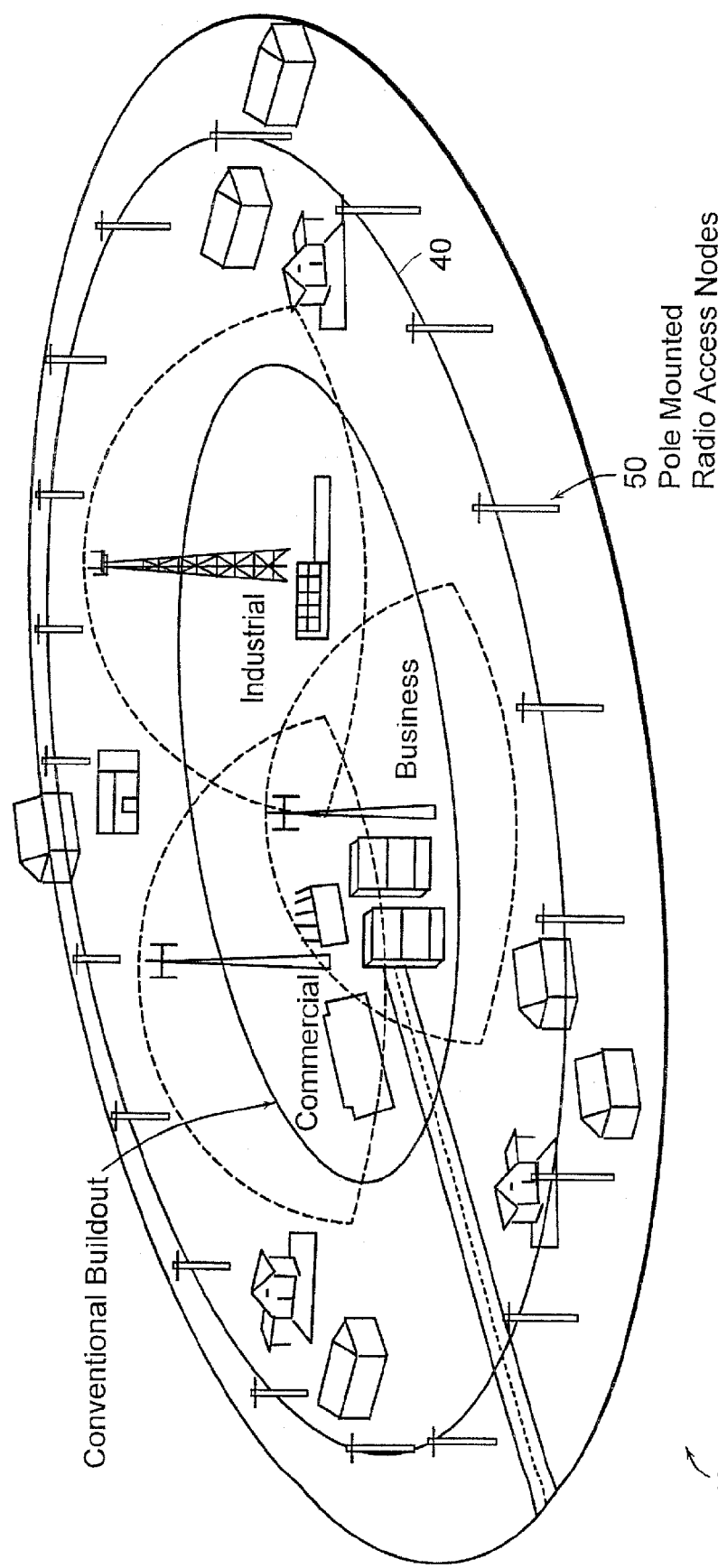
FIG. 2 illustrates one possible deployment for the open access system.

FIG. 2 depicts one possible deployment scenario for the open access system 10. As shown, the system consists of a multiple Radio Frequency (RF) Access Node 50 (RAN) units that may be located at relatively lower height locations such as utility poles. The open access network 10 distributes RF signals to and from the RANs, using a shared transport media 40 such as an optical fiber using high speed transport signaling. The physical deployment of the open access system is thus quite different from the higher radio towers required in a conventional system.

Returning attention to FIG. 1, the hub 35 provides the hardware and software interfaces between the high speed data link 40 and the individual wireless carrier base stations 20. The base stations 20 are considered to be original equipment manufacturer (OEM) type equipment to be provided and/or specified by the tenant 15 and are not provided as part of the open access system 10 itself. Hub 35 co-locates with the base stations 20 at a designated hub site 30. In a maximum configuration, a 3-sector base station 20 connects to 24 RAN Units 50, via an open access Hub 35. Hub 35 can be expanded to connect multiple base stations 20 (one or multiple wireless carriers) and their associated RAN Units 50.

RAN units 50 are distributed throughout a given community in accordance with the network operator's RF plan. RAN Units 50, along with associated antennas 56, are typically/installed on utility poles 58, and connect to Hub Unit 35 via a fiber optic cable 40.

Network Management System 60 provides remote monitoring and control of the open access network by the network operator via the open access system 10. Network Management System 60 also allows for the network operator to pass selected control or status information concerning the open access network 10 to or from the individual wireless carriers or tenants. By "tenant" it is meant to refer to the wireless carrier, Wireless Service Provider (WSP), or other business entity that desires to provide wireless service to end customers.

The open access system 10 supports essentially any wireless protocol to be an open Access platform. In one configuration, open access system 10 supports the multiple 800/1900 MHz wireless service providers, and wireless data providers who require last mile access to their targeted customers, all at the same time. In another configuration, open access system 10 supports the lower frequency 400 and 700 MHz bands and the WCS/ISM/MMDS, U-NII wireless data bands.

In a preferred configuration, the open access network consists of radio access nodes (RAN) 50 distributed to achieve the desired RF signal presence and a hub 35 and high speed data link 40, which interconnects the base station RF signals with the RANs 50.

The distributed architecture is comprised of multi-protocol, frequency-independent radio access nodes 50. In the preferred embodiment at the present time, each RAN 50 supports from 1 to 8 operators, commonly referred to as tenants 15, of various protocols and frequencies. It should be understood that other configurations could support a smaller or greater number of tenants per RAN 50. Within each RAN 50, the wireless service provider "tenants" have typically leased space for the service provider to install corresponding individual radio elements in a RAN slice 52. RANs 50 connect to a centralized base station locale 30 where the tenants 15 connect to through an open access HUB 35 to the specific tenant's base station electronics. Each HUB 35 can scale to support one to three sectors of a base stations 20. It should be understood that base stations with a greater number of sectors 20 may also be supported.

RANs 50 are interconnected via fiber links 40 to centrally located HUB sites 30 and associated base stations 20. RANs 50 wide area distribution is logically a "horizontal tower" with access provided to a single "tenant" or shared amongst multiple tenants (wireless service providers). The generic architecture supports scaling from a single operator to supporting up to multiple operators across the multiple frequency bands per shelf. Multiple shelves may be stacked to serve additional tenants, as needed.

HUB 35 and RAN 50 network elements incorporate a System Network Management Protocol (SNMP) communication scheme to facilitate integration with the Host operator's network management system 60. This allows easy and complete communication across the open access system 10 with a high level of control and visibility.

Figure 3A:
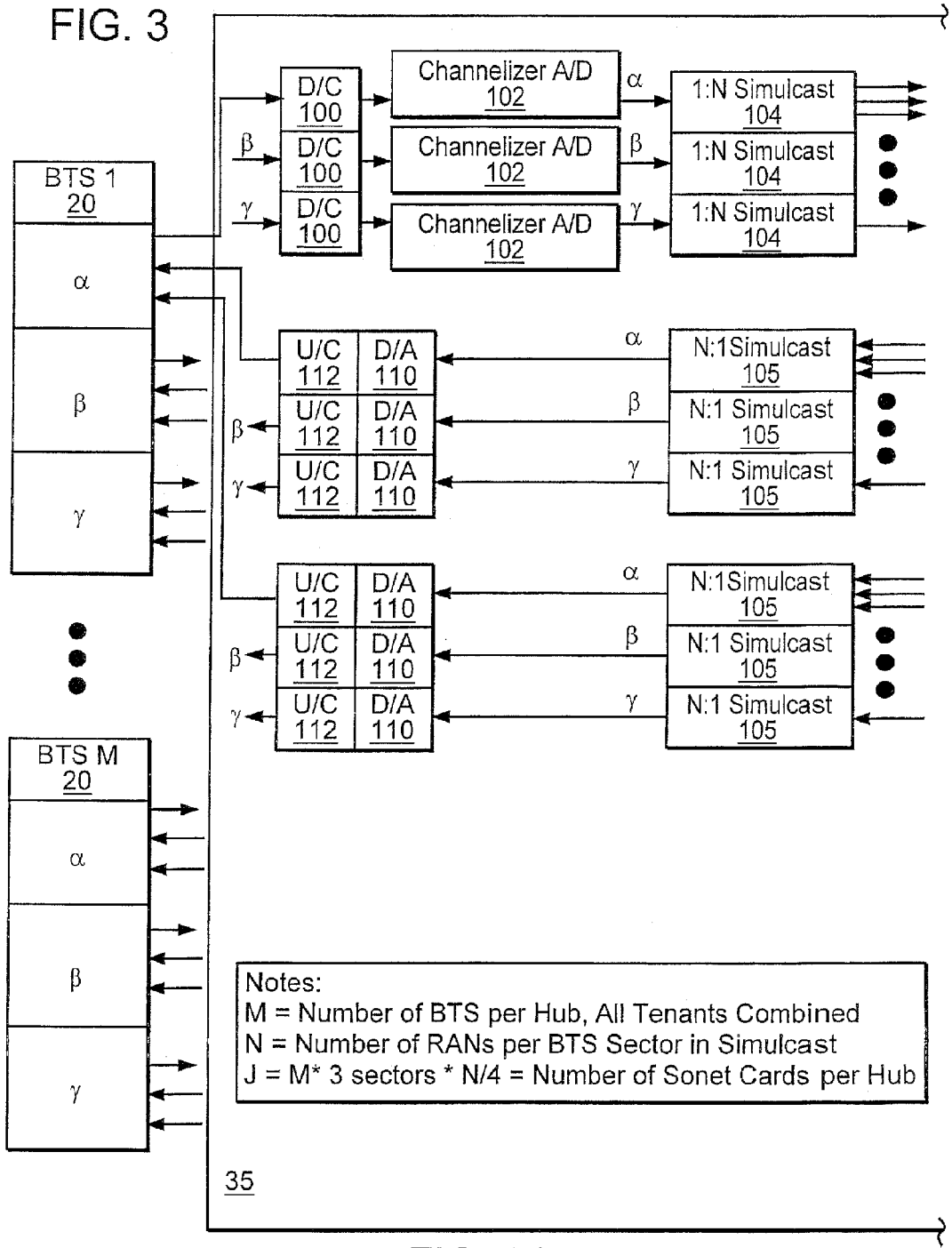
FIG. 3 is a more detailed diagram of a hub signal path for the open access system.
Figure 3B:
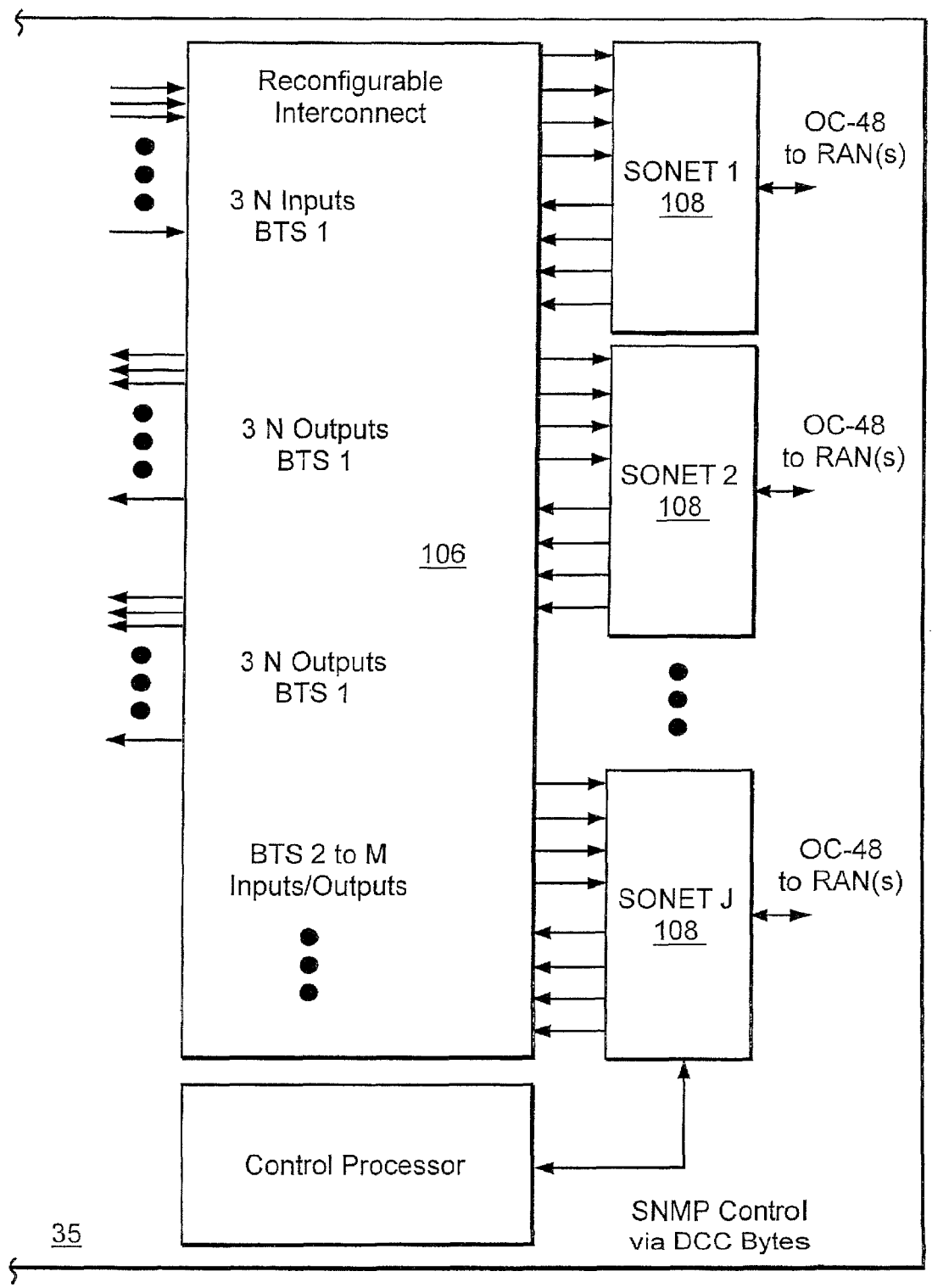

Referring now to FIG. 3, an RF signal is transmitted from a BTS 20 to open access hub 35. The RF signal is of any bandwidth up to typically 15 MHz (future bandwidths may be greater) and follows the hub signal path as shown in FIG. 3. The signal is down converted to a 50 MHz (+/−7.5 MHz) Intermediate Frequency (IF) signal by the down converter (D/C) 100. The IF signal is then converted to a 14 byte stream, at least at 42.953 Msps, by analog-to-digital (A/D) channelizer 102. Two control bits are added to the stream at a field programmable gate array (FPGA) within the A/D channelizer 102. The 16 byte stream, still at 42.953 Msps, is then serialized using 8B/10B encoding producing a 859 Mbps bit stream or an STS-12 type transport signal. The STS-12 signal is then distributed along a number of paths equal to the number of RANs in simulcast for each BTS sector. The STS-12 signal is preferably transmitted to the designated RAN Units 50 by interconnect 106 cross-connecting the STS-12 signal to a 4:1 multiplexer 108 that converts the STS-12 signal to an OC-48 signal. In a preferred embodiment, as shown in FIG. 1, a base station 20 located at any hub site 30 can transmit its associated signal to any RAN Unit 50 using a digital cross-connect 37 connected between Hubs 35. In one example, lower rate signals (STS-3, 4, etc.) may be combined into higher rate shared transport signals (e.g. OC-192).

Figure 4:
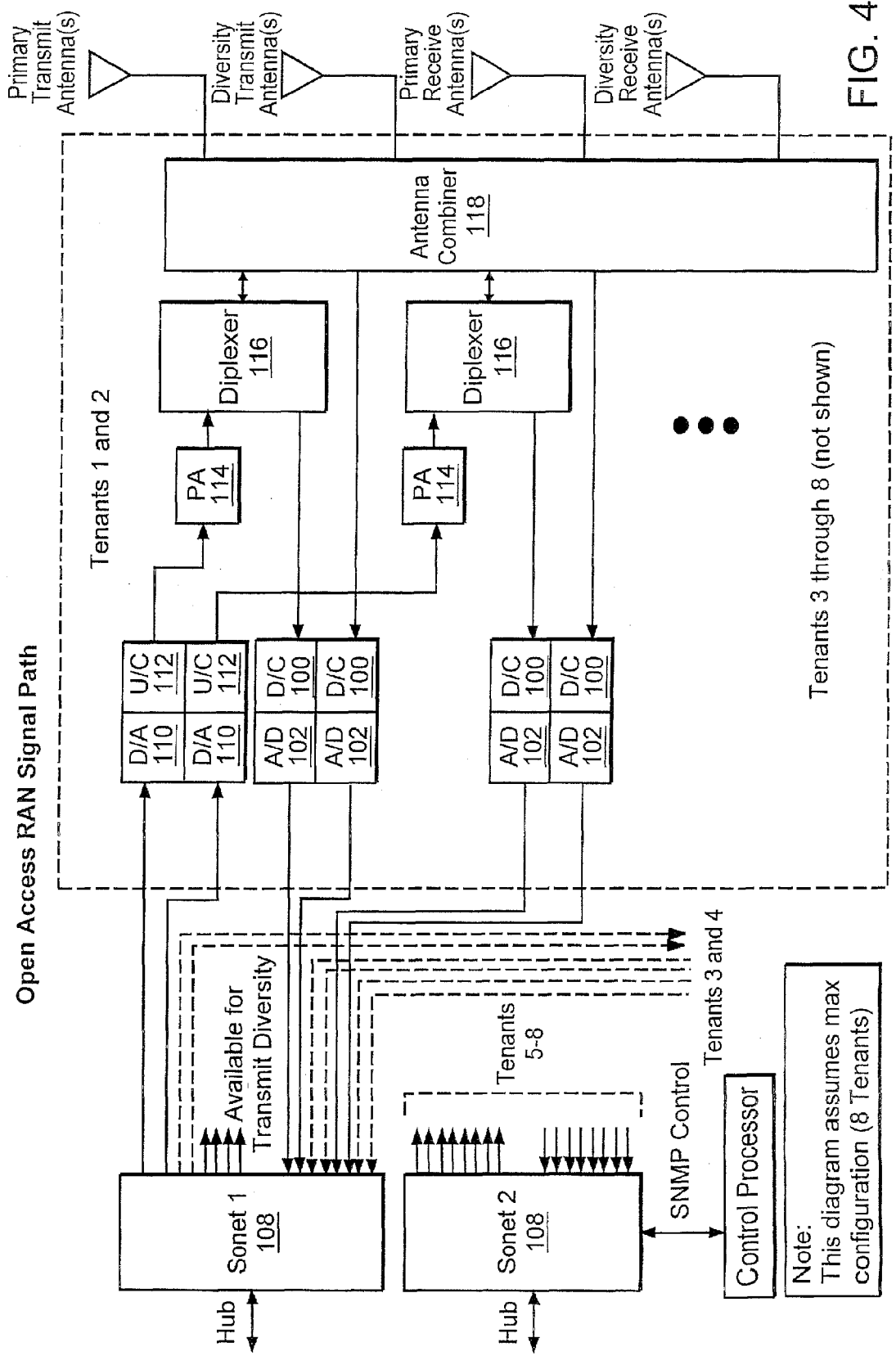
FIG. 4 is a more detailed diagram of a Radio Access Node signal path.

Referring to FIG. 4, the OC-48 signal enters a multiplexer 108 where the signal is converted from an OC-48 signal back to a STS-12 signal. The STS-12 signal is then digital-to-analog (D/A) converted to a 50 MHz (+/−7.5 MHz) signal by the D/A Channelizer 110. The 50 MHz (+/−7.5 MHz) signal is up converted 112 (U/C) to the required RF signal between. The RF signal is then power amplified (PA) 114 at its associated RF frequency and transmitted through diplexer 116 that couples transmit and receive signals to the same antenna. The RF signal is then radiated by the antenna.

Referring to FIG. 4, an RF signal is received by an antenna or antenna array and the signal is then down converted (D/C) 100 to a 50 MHz (+/−7.5 MHz) signal. The RF signal is then converted to a 14 bit stream, at least at 42.953 Msps, in the (A/D) channelizer 102. Two control bits are added to the bit stream at a digital filter implemented in a Field Programmable Gate Array (FPGA) within the A/D channelizer 102. The 16 byte stream, at least at 42.953 Msps, is serialized using 8B/10B encoding producing a 859 Mbps bit stream or STS-12 signal. The STS-12 signal is then combined with the other tenant signals by a 4:1 multiplexer 108 that converts the STS-12 signal to an OC-48 signal. This signal is then transmitted to the designated open access hub 35.

Referring to FIG. 3, the OC-48 signal is received at the open access hub 35 at the multiplexer 108 that converts the OC-48 signal to a STS-12 signal. The STS-12 signal is then cross-connected through interconnect 106 to a designated BTS 20. The STS-12 signal is summed up to 8, 1 with signals from other RANs in the same simulcast and is then D/A converted 110 to a 50 MHz (+/−7.5 MHz) IF signal. It should be understood that in other configurations, more than 8 signals could be summed together. The 50 MHz signal IF signal is the up converted (U/C) 112 to the desired radio carrier and forwarded to the BTS 20. Providing for two receive paths in the system 10 allows for receive diversity.

The location of the RANs will be selected to typically support radio link reliability of at least 90% area, 75% at cell edge, as a minimum, for low antenna centerline heights in a microcellular architecture. The radio link budgets, associated with each proposed tenant 70, will be a function of the selected air protocol and the RAN 50 spacing design will need to balance these parameters, to guarantee a level of coverage reliability.

Because of differences in air interface performance and mobile unit transmit powers/receive sensitivities the open access system 10 requires additional design considerations. For example, an optimal RAN location grid spacing for an IS-136 TDMA protocol is not the same as for an IS-95 CDMA protocol.

To minimize the number of RANs 50, open access multiprotocol wireless infrastructure requires that all the participating wireless protocols share common geographic transmit/receive locations. These locations are referred to as shared RANs 50, and the distance at which they can be located from any serviceable mobile unit sets the nodes' maximum separation. However, this distance limit is different for each wireless protocol due to performance differences in their respective air interface power or link budgets. A simple, but non-optimum, approach is to determine the RAN 50 locations on the wireless protocol requiring the closest spacing (i.e. smallest RF link budget). The base stations 20 located at the central hub sites 30 are then optically connected to the co-located RAN sites 50 giving each protocol the same coverage footprint per base station sector. This approach is highly non-optimum for those protocols having larger link budgets and will yield heavily overlapped coverage areas. Similarly, basing RAN spacing on the larger link budget will yield coverage gaps for the weaker link protocols.

According to the present invention, differences between the wireless protocols' link budgets are equalized through simulcasting of multiple RANs sites 50. Simulcasting allows a wireless infrastructure provider to reduce the link budget of the RAN 50 for higher power protocols to match those of the others, while increasing the net coverage range of the associated base station sectors 20. A reduction in a RANs 50 link budget (and therefore coverage range) is offset by the increase in the number of RAN's 50 that can be simultaneously served by the associated base station sectors 20. This maintains the base station 20 coverage area for the protocols with a large link budget while maintaining the closer RAN 50 spacing required for those protocols with a small link budget. At the same time, the reverse link can be brought into balance with the forward link for a wide variety of forward RF carrier power levels.

FIG. 5 shows a simplified link budget for three example collocated protocols: IS-136 (TDMA), GSM 1900 and CDMA. It should be understood that the same principles apply to other wireless air interfaces such as: PEN, GSM, 3G (GPRS/EDGE), CDMA 2000, W-CDMA, etc. The protocol with the lowest intrinsic reverse link budget (IS-136) is balanced with the CDMA protocol through the use of a larger number of RANs in the simulcast group for CDMA. All of the protocols' simulcast is also collectively scaled to balance with the forward link. For a higher-power deployment than is shown in FIG. 5 (similar to that of a large tower) the least robust air interface typically uses a simulcast of one and all other air interfaces scale up from there. Since the illustrated scenario is for is a lower power microcellular build-out, all protocols use a non-unity simulcast. The forward transmit powers for each RF carrier are properly scaled to equalize the forward link budgets of the various protocols. Call capacity per geographic area is finally established by selecting the number of RF carriers based upon the final simulcast ratio.

The determination of parameters may proceed as follows.

Forward and reverse RF link budgets are first established for each of the wireless protocols of interest. At this point, simulcast is not entered as a factor into the analysis.

The wireless protocol with the smallest link budget is then identified and its coverage area and capacity are optimized.

The system build-out, lower power (and smaller size) power amplifiers are used to minimize cost and size of the installation. Simulcast of multiple RANs 50 is used to bring the forward and reverse paths in balance for the above identified wireless protocol. This establishes the allowable RF path loss and therefore the physical spacing for the shared RANs 50.

For each of the other collocated protocols, the number RANs 50 in simulcast are selected to match the baseline link budget established above. Each protocol will have a different simulcast number. The sensitivity at each RAN 50 will change as 10 log.sub.10 (the number of RANs 50 in simulcast).

The forward transmit power levels are then adjusted to bring the forward and reverse paths into agreement.

The number of simultaneous RF carriers is selected for each protocol based upon the call capacity required in the geographic coverage area. Changing the number of carriers does not affect the link balance or the number of RANs 50 in simulcast.

Figure 6:
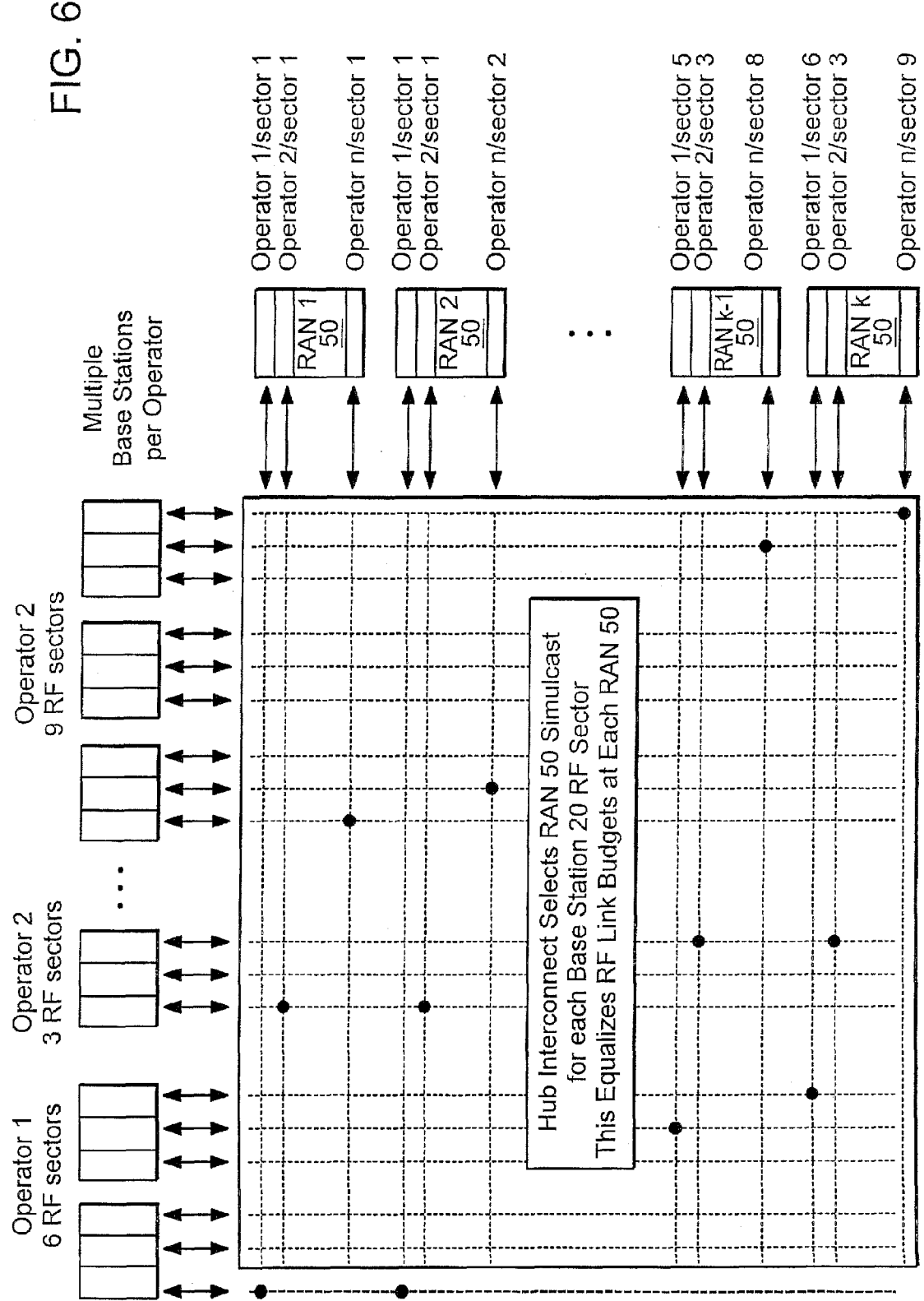
FIG. 6 is a more detailed view of a cross connect providing for the ability to connect multiple base stations for different wireless operators to a network of Radio Access Nodes.

Referring to FIG. 6, this type of infrastructure build-out requires a distributed RF system capable of cross-connecting multiple base stations 20 from different tenants or Wireless Service Providers (WSPs) to a network of RANs 50 using distribution ratios that differ for each wireless protocol. A network that does not support this aspect of the invention would simply connect the base station sectors for all the WSPs to the same complement of RANs 50. Sector 1/WSP 1 through sector 1/WSP n would all connect to the same RANs 50. Similarly, sector 2/WSP 1 through sector 2/WSP n connect to a different but common group of RANs 50.

Figure 7:
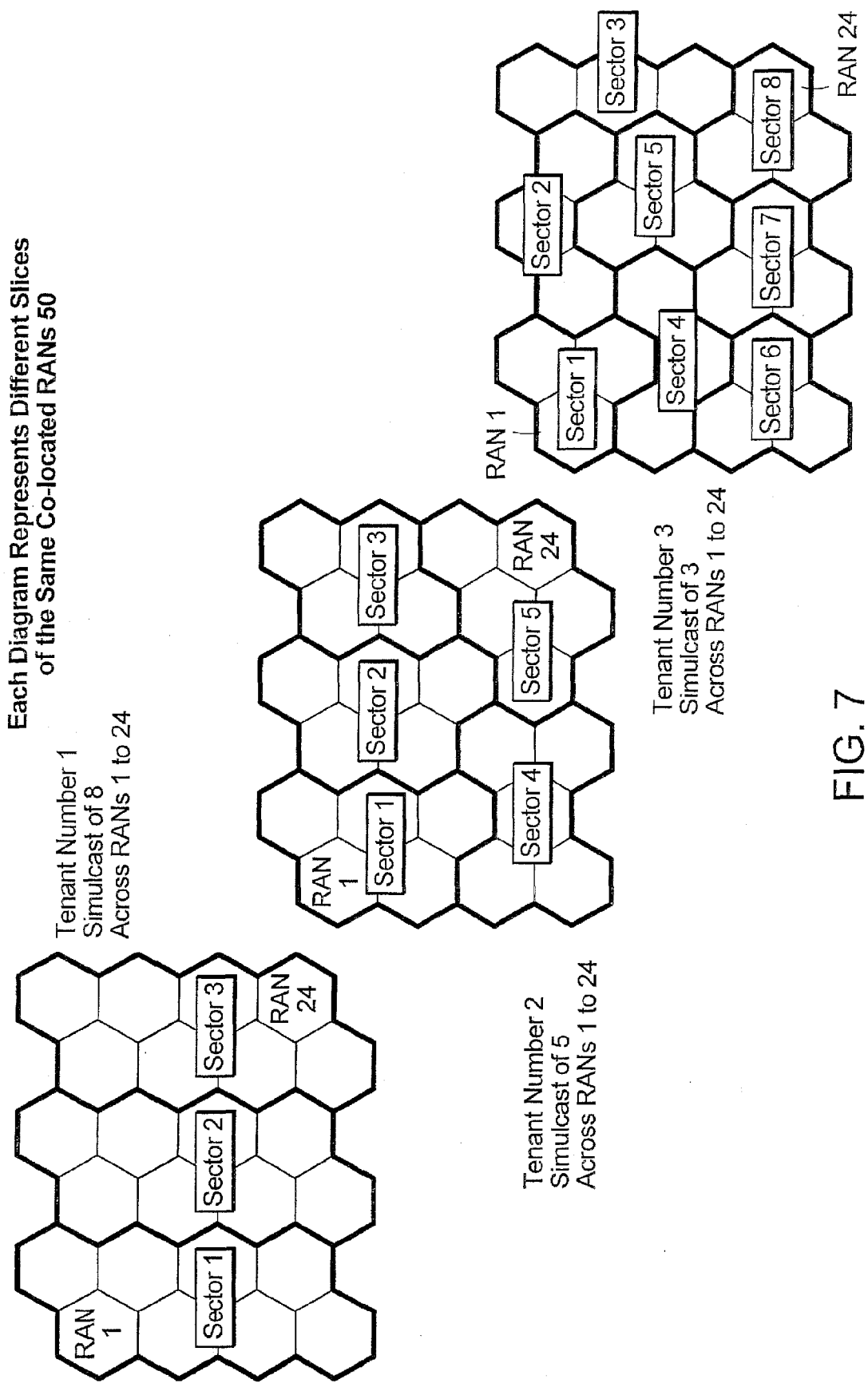
FIG. 7 is a diagram illustrating how RAN slices may be allocated to different tenants and sectors in simulcast.

Referring to FIGS. 6 and 7, the system described by this invention selects a different simulcast scheme for each individual sector of each wireless operator and the total collection of RANs 50 distributed through a geographic coverage area. For example: Sector1/WSP1 does not necessarily connect to the same complement of RANs 50 as sector 1/WSP 2 through sector 1/WSP n. There may be only partial or even no overlap between the connectivity assignments due to the variable simulcast ratios across the differing protocols. Sector 2/WSP 1 not only does not fully overlap with sector 2/(WSP 2 through n) but also may also partially overlap with sector 1/(2 though n) in RAN assignments.

Figure 8:
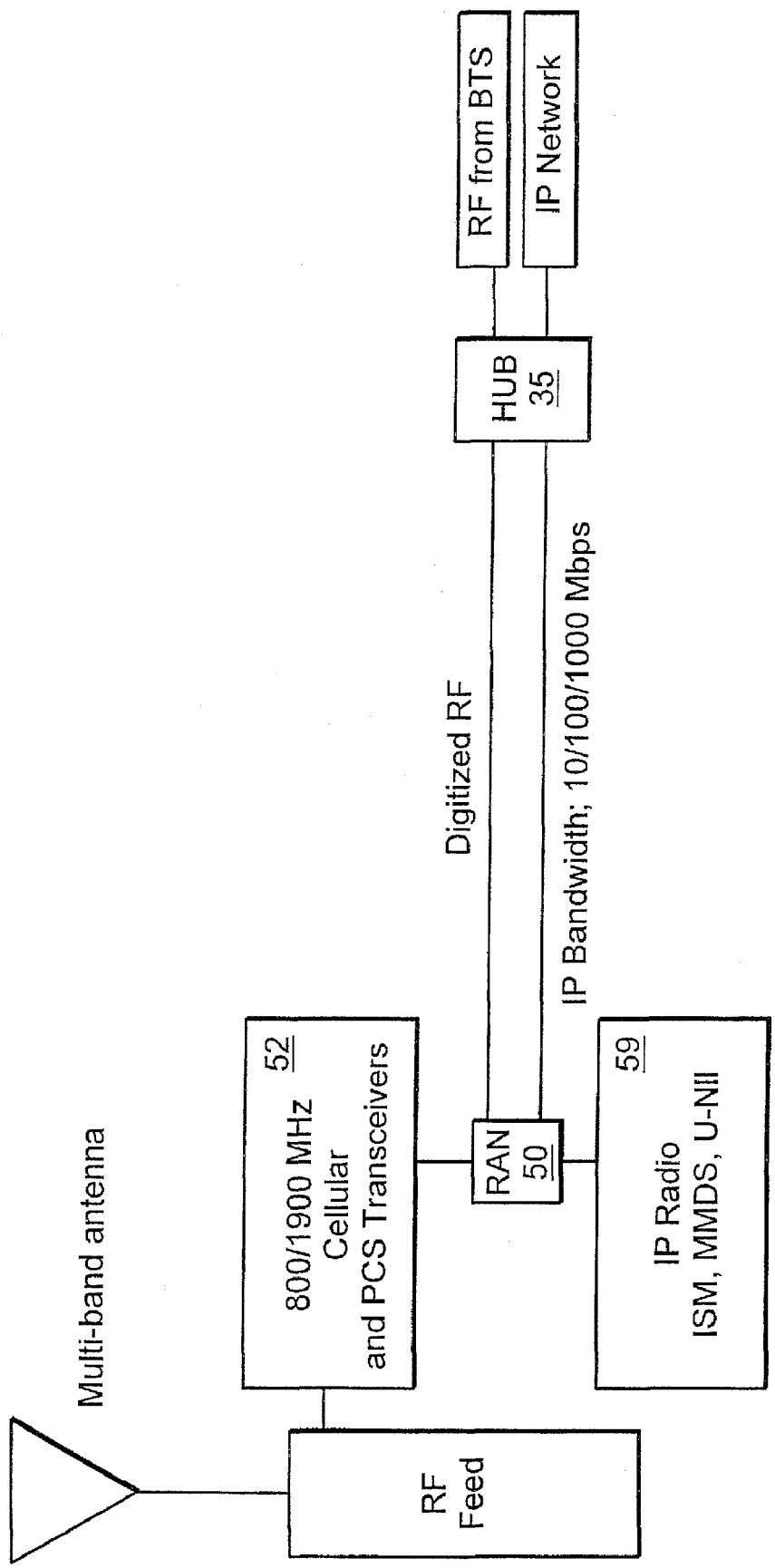
FIG. 8 is a more detailed view of one possible configuration for the hubs and RANS over which both the transport traffic signals and control signaling may be carried.

Referring in particular to the example shown in FIGS. 6 and 7, WSP or tenant 1 is operating with a CDMA protocol and therefore is simulcasting a group of 8 RANs within a total number of 24 RANs 50. Each RF sector is connected to a different grouping of 8 RANs. The illustrated drawing in FIG. 8 is for a group of 24 contiguous cells showing how the three tenants may share them.

Tenant 2 is operating with a simulcast group size of 5. Thus 5 different RANs are allocated to each of the 5 sectors for this tenant. Note that since simulcast number of 5 is not an integer divisor of the number of cells in the RAN group, that number being 24 in this example, sector 3 has only 4 cells allocated to it. Tenant 3 is operating with the simulcast group size of 3 and thus is operating with 8 sectors, each having 3 RANs associated with it.

The hub interconnect in FIG. 6 then selects RAN 50 simulcast groupings for each sector based upon the desired groupings desired for each tenant. This permits for equalization of the radio frequency link budgets in each RAN 50 group.

NMS 60 distributes individual alarms to the appropriate tenants, and maintains secure transmission for each tenant, whereas each tenant 15 is provided access to only their own respective system, for monitoring and control purposes. The open access product allows an operator to customize the RAN 50 RF parameter settings to control the radio link environment, such as signal attenuation, gain, and other methods for strong signal mitigation.

In sector configuration of the system, the Hub/RAN ratio is configurable from 1 to 8 RANs per BTS sector. The RANs 50 is remote configurable through the open access operator's NMS 60, to support what is commonly referred to as sector re-allocation. The sector allocation is defined by the hosted wireless service provider's traffic loading analysis and controlled by the inputs from the specific tenant's NMS 15 via the open access system 10 intranet 18.

The actual RAN 50 cell radius will be largely a function of final antenna radiation center above ground.

Returning attention now to FIGS. 1 and 2 briefly, in general, the data link uses one or more fiber optic connections between a hub 35 and one or more RAN's 50. Data link uses a mix of electrical multiplexing, wavelength multiplexing, and multiple fibers to support the bandwidth requirements of the configuration in a cost-effective manner. Data link design should optimize its cost by using the best combination of different multiplexing schemes based on physical fiber costs, leased fiber costs and technology evolution. Data link supports whole RF band transportation (digitized RF), IP packets, and other traffic as need for open access data transmission, system management and control.

The data link 40 connects a Hub 35 and multiple RAN's 50 using either a Ring or Star network topology, or possibly a mix of the two. In one configuration, open access system 10 should support up to, for either a ring or star topology, at least several miles of fiber length. The actual fiber lengths will be guided by optical path link budgets and specific RF protocol limits.

Referring to FIG. 8, in addition to combining digitized RF for common transport, this invention allows the combination of digitized RF with conventional packet data (e.g. IP Packets). This allows the concurrent support of packet driver wireless radios 59 co-located at the RANs with RAN slices 52, the latter which support BTSs 20. The data radios 59 do not require a BTS 20 at the hub.

The data link is available to support connecting fixed wireless data radios 59 fitted in a RAN 50 to a centrally located router in HUB site 30. In one configuration, IP packet traffic provides 10 Mbps, scalable up to 100 Mbps, to be shared amongst the multiple RAN data tenants. Networking architecture supports modularity and scalability for increased data rates. The data link supports multiple data radios at 1 to 25 Mbps data rates per data radio tenant.

Figure 9:
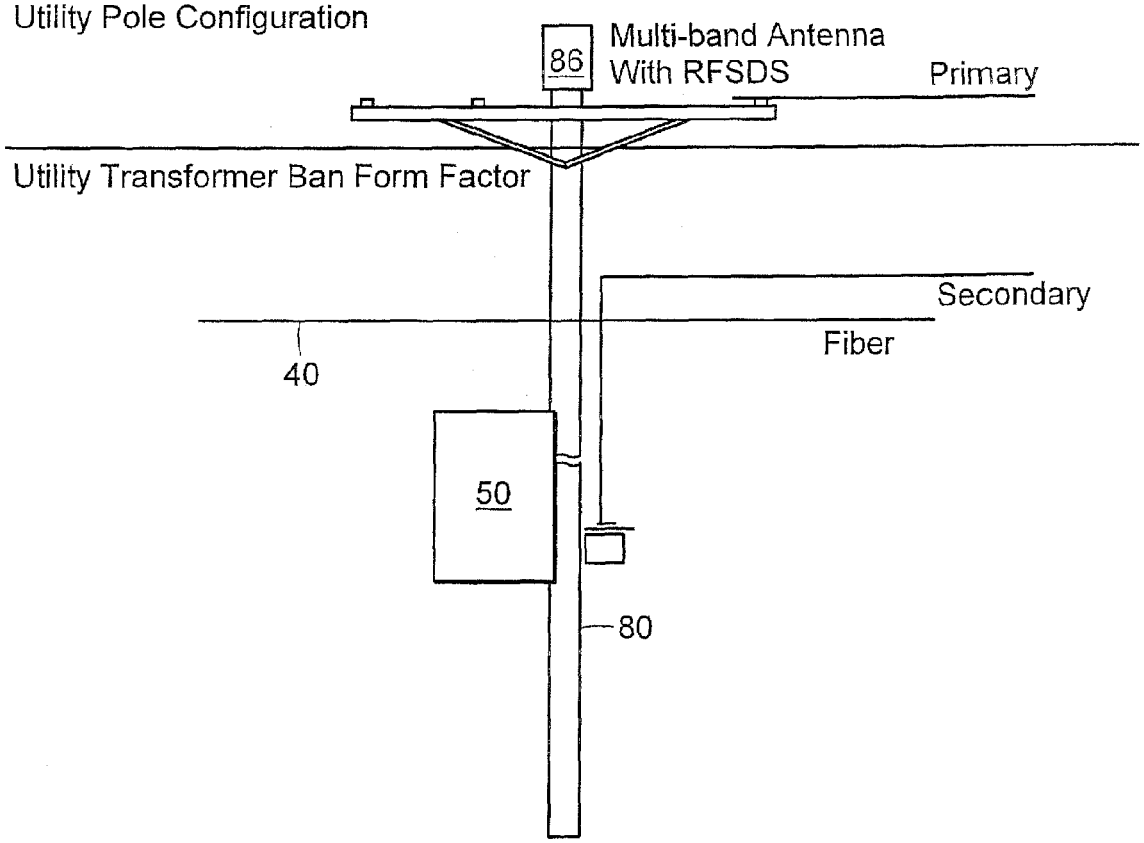
FIG. 9 is a detailed view of one possible antenna configuration.

Referring to FIG. 9, a utility pole antenna 86 is preferred as being unobtrusive and similar in dimension to the utility pole 80. Antenna 86 at least blends in with its immediate surroundings. The utility pole multi-band antenna 86 typically fits at least within a 12" diameter by 72" tall volume. The minimum pole height to the antenna base is typically at least 31 ft. agl.

In the system the multi-band antenna capability addresses 800, 1900, and at least provides volume for wireless data bands. In a preferred configuration, the antenna is multi-band and provides radiating aperture to cover all the listed bands such as, 800, 1900, WCS/ISM/MMDS and U-NII. Antenna design, antenna sizing and performance is specific for each deployment configuration.

The system configurations are modular and scalable from a single WSP application to a multi-WSP tenancy, for both the RF transceiver assemblies and the data link configurations. The system configurations have the ability to add tenants after initial install in one-tenant steps.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for distributing cellular radio frequency signals, the system comprising:
   a hub unit configured to communicate with a first base station associated with a first cellular service provider and a second base station associated with a second cellular service provider, the first base station configured to use a first air interface and the second base station configured to use a second air interface; and
   a radio access node located at a location that is remote from the hub unit;
   wherein the radio access node is configured to digitize a first analog radio frequency signal in order to generate first digital data indicative of the first analog radio frequency signal, wherein the first analog radio frequency signal is broadcast from a first mobile unit associated with the first cellular service provider using the first air interface;

wherein the radio access node is configured to digitize a second analog radio frequency signal in order to generate second digital data indicative of the second analog radio frequency signal, wherein the second analog radio frequency signal is broadcast from a second mobile unit associated with the second cellular service provider using the second air interface;

wherein the first and second digital data are transported from the radio access node to the hub unit using a shared transport medium;

wherein the hub unit comprises:
  a first digital-to-analog converter configured to reconstruct a version of the first analog radio frequency signal from the first digital data, and
  a second digital-to-analog converter configured to reconstruct a version of the second analog radio frequency signal from the second digital data, wherein the reconstructed version of the first analog radio frequency signal is provided to the first base station associated with the first cellular service provider and the reconstructed version of the second analog radio frequency signal is provided to the second base station associated with the second cellular service provider; and wherein the radio access node is configured to generate first data packets from a first data radio frequency signal, wherein the first data packets are communicated to the hub unit using the shared transport medium.

2. The system of claim 1, wherein the hub unit communicates second data packets to the radio access unit, wherein a second data radio frequency signal is generated from the second data packets at the radio access node.

3. The system of claim 2, wherein the first data radio frequency signal and the second data radio frequency signal have at least one of: different carrier frequencies and the same carrier frequencies.

4. The system of claim 1, wherein the hub unit further comprises a router.

5. The system of claim 1, wherein the radio access node further comprises at least one packet driver wireless radio.

6. The system of claim 1, wherein the radio access node further comprises a plurality of packet driver wireless radios, wherein the plurality of packet driver wireless radios are shared among the first and second cellular service providers.

7. The system of claim 1, wherein the first data packets comprise at least one of Internet Protocol (IP) packets and ETHERNET packets.

8. The system of claim 1, wherein the radio access node combines the first and second digital data and the first data packets before applying the first and second digital data and the first data packets to the shared transport medium.

9. The system of claim 1, wherein the shared transport medium comprises an optical communication medium.

10. The system of claim 1, wherein the first and second analog radio frequency signals and the first data radio frequency signals are received using at least one antenna associated with the radio access node.

11. The system of claim 1:
  wherein the hub unit is configured to digitize a third analog radio frequency signal in order to generate third digital data indicative of the third analog radio frequency signal, wherein the third analog radio frequency signal is broadcast from the first base station associated with the first cellular service provider using the first air interface;
  wherein the hub unit is configured to digitize a fourth analog radio frequency signal in order to generate fourth digital data indicative of the fourth analog radio frequency signal, wherein the fourth analog radio frequency signal is broadcast from the second base station associated with the second cellular service provider using the second air interface;
  wherein the third and fourth digital data are transported to the radio access node from the hub unit; and
  wherein the radio access node comprises a third digital-to-analog converter and a fourth digital-to-analog converter, wherein the radio access node is configured to reconstruct a version of the third analog radio frequency signal from the third digital data using the third digital-to-analog converter and to reconstruct a version of the fourth analog radio frequency signal from the fourth digital data using the fourth digital-to-analog converter, wherein the reconstructed versions of the third and fourth analog radio frequency signals are radiated in a coverage area associated with the radio access node.

12. A radio access node for use in a system for distributing cellular radio frequency signals, the radio access node comprising:
  an antenna interface to couple the radio access node to at least one antenna associated with the radio access node;
  a shared transport medium interface to couple the radio access node to a shared transport medium; and
  first and second analog-to-digital converters, wherein the radio access node is configured to digitize, using the first analog-to-digital converter, a first analog radio frequency signal in order to generate first digital data indicative of the first analog radio frequency signal, wherein the first analog radio frequency signal is broadcast from a first mobile unit associated with the first cellular service provider using the first air interface and wherein the radio access node is configured to digitize, using the second analog-to-digital converter, a second analog radio frequency signal in order to generate second digital data indicative of the second analog radio frequency signal, wherein the second analog radio frequency signal is broadcast from a second mobile unit associated with the second cellular service provider using the second air interface;
  wherein radio access node is configured to transport the first and second digital data from the radio access node to a hub unit using the shared transport medium;
  wherein the hub unit comprises first and second digital-to-analog converters configured to reconstruct versions of the first and second analog radio frequency signals, respectively, using the first and second digital data, respectively;
  wherein the radio access node is located at a location that is remote from the hub unit; and
  wherein the radio access node is configured to generate first data packets from a first data radio frequency signal, wherein the first data packets are communicated to the hub unit using the shared transport medium.

13. The radio access node of claim 12, wherein the hub unit communicates second data packets to the radio access unit, wherein a second data radio frequency signal is generated from the second data packets at the radio access node.

14. The radio access node of claim 13, wherein the first data radio frequency signal and the second data radio frequency signal have at least one of: different carrier frequencies and the same carrier frequencies.

15. The radio access node of claim 12, wherein the radio access node further comprises at least one packet driver wireless radio.

16. The radio access node of claim 12, wherein the radio access node further comprises a plurality of packet driver wireless radios, wherein the plurality of packet driver wireless radios are shared among the first and second cellular service providers.

17. The radio access node of claim 12, wherein the first data packets comprise at least one of Internet Protocol (IP) packets and ETHERNET packets.

18. A method of distributing cellular radio frequency signals comprising:
- digitizing, at a radio access node using a first analog-to-digital converter, a first analog radio frequency signal in order to generate first digital data indicative of the first analog radio frequency signal, wherein the first analog radio frequency signal is broadcast from a first mobile unit associated with a first cellular service provider using a first air interface;
- digitizing, at the radio access node using a second analog-to-digital converter, a second analog radio frequency signal in order to generate second digital data indicative of the second analog radio frequency signal, wherein the second analog radio frequency signal is broadcast from a second mobile unit associated with the second cellular service provider using a second air interface;
- generating, at the radio access node, first data packets from a first data radio frequency signal;
- transporting the first and second digital data and the first data packets from the radio access node to a hub unit using a shared transport medium;
- reconstructing, at the hub unit, a version of the first analog radio frequency signal from the first digital data using a first digital-to-analog converter;
- reconstructing, at the hub unit, a version of the second analog radio frequency signal from the second digital data using a second digital-to-analog converter;
- providing the reconstructed version of the first analog radio frequency signal from the hub unit to a first base station associated with the first cellular service provider; and
- providing the reconstructed version of the second analog radio frequency signal from the hub unit to a second base station associated with the second cellular service provider;
- wherein the first base station is configured to use the first air interface and the second base station configured to use the second air interface; and
- wherein the radio access node is located at a location that is remote from the hub unit.

19. The method of claim 18, further comprising providing the first data packets to a router associated with the hub unit.

20. The method of claim 18, wherein the first data packets comprise at least one of Internet Protocol (IP) packets and ETHERNET packets.

* * * * *